US010404359B2

(12) United States Patent
Wakabayashi et al.

(10) Patent No.: US 10,404,359 B2
(45) Date of Patent: Sep. 3, 2019

(54) MOBILE COMMUNICATIONS SYSTEM, METHODS, CONTROLLER, RELAY NODE AND COMMUNICATIONS TERMINAL

(71) Applicant: SONY CORPORATION, Tokyo (JP)

(72) Inventors: Hideji Wakabayashi, Basingstoke (GB); Brian Alexander Martin, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/570,794

(22) PCT Filed: Apr. 21, 2016

(86) PCT No.: PCT/EP2016/058897
§ 371 (c)(1),
(2) Date: Oct. 31, 2017

(87) PCT Pub. No.: WO2016/180612
PCT Pub. Date: Nov. 17, 2016

(65) Prior Publication Data
US 2018/0123683 A1 May 3, 2018

(30) Foreign Application Priority Data
May 11, 2015 (EP) .................................... 15167227

(51) Int. Cl.
*H04W 4/00* (2018.01)
*H04B 7/26* (2006.01)
(Continued)

(52) U.S. Cl.
CPC ....... *H04B 7/2606* (2013.01); *H04B 7/15528* (2013.01); *H04W 40/04* (2013.01);
(Continued)

(58) Field of Classification Search
USPC ........................................................ 370/329
See application file for complete search history.

(56) References Cited

U.S. PATENT DOCUMENTS 8,693,413 B2* 4/2014 Kanazawa ............ H04L 1/0026
370/329
2008/0031197 A1* 2/2008 Wang ................. H04B 7/15542
370/331
(Continued)

FOREIGN PATENT DOCUMENTS

| WO | 2010/080077 A1 | 7/2010 |
| WO | 2015/018058 A1 | 2/2015 |
| WO | 2016/128277 A1 | 8/2016 |

OTHER PUBLICATIONS

"3rd Generation Partnership Project; Technical Specification Group Radio Access Network; Small cell enhancements for E-UTRA and E-UTRAN—Physical layer aspects (Release 12)," Technical Report, 3GPP TR 36.872 V12.1.0, Dec. 2013, (100 pages).

(Continued)

*Primary Examiner* — Phuongchau Ba Nguyen
(74) *Attorney, Agent, or Firm* — Xsensus LLP

(57) ABSTRACT

A controller is configured to control a first of plural relay nodes to transmit signals representing data to one of communications terminals received from a base station or to receive signals representing data from a communications terminal for transmission to the base station, wherein, upon first predetermined conditions being met, to control a second of the plurality of relay nodes to transmit signals representing the data to the communications terminal received from the base station or to receive signals representing the data from the communications terminal for transmission to the base station, and to control the communications terminal to transmit a first signal representing at least a first part of the data to the first relay node for transmission to the base station, and to transmit a second signal representing at least a second part of the data to the second relay node for transmission to the base station.

17 Claims, 7 Drawing Sheets

(51) Int. Cl.
  *H04B 7/155*  (2006.01)
  *H04W 76/15*  (2018.01)
  *H04W 40/04*  (2009.01)
  *H04W 40/12*  (2009.01)
  *H04W 40/22*  (2009.01)
  *H04W 40/34*  (2009.01)
  *H04L 5/00*  (2006.01)

(52) U.S. Cl.
  CPC .......... *H04W 40/12* (2013.01); *H04W 40/22* (2013.01); *H04W 40/34* (2013.01); *H04W 76/15* (2018.02); *H04L 5/001* (2013.01)

(56) References Cited

U.S. PATENT DOCUMENTS

| | | |
|---|---|---|
| 2009/0175214 A1 | 7/2009 | Sfar et al. |
| 2015/0085741 A1 | 3/2015 | Sfar et al. |
| 2015/0295634 A1 | 10/2015 | Zhang et al. |
| 2016/0142128 A1 | 5/2016 | Sfar et al. |

OTHER PUBLICATIONS

Harri Holma, et al., "LTE for UMTS—OFDMA and SC-FDMA Based Radio Access," Wiley 2009, ISBN 978-0-470-99401-6, reprinted Jun. and Aug. 2009, Jan. 2010, (Index and Abstract only), (8 pages).

Qualcomm Incorporated, "Study on LTE Device to Device Proximity Services," 3GPP TSG RAN Meeting #58, RP-122009, Dec. 4-7, 2012, (6 pages).

"3rd Generation Partnership Project; Technical Specification Group Radio Access Network; Study on LTE Device to Device Proximity Services; Radio Aspects (Release 12)," Technical Report, 3GPP TR 36.843 V12.0.1, Mar. 2014, (50 pages).

Qualcomm Incorporated, "Work Item Proposal for Enhanced LTE Device to Device Proximity Services," 3GPP TSG RAN Meeting #66, RP-142229, Dec. 8-11, 2014, (8 pages).

Qualcomm Incorporated, "Work Item Proposal on LTE Device to Device Proximity Services," 3GPP TSG RAN Meeting #63, RP-140519, Mar. 3-6, 11, 2014, (7 pages).

International Search Report dated Sep. 2, 2016 in PCT/EP2016/058897 filed Apr. 21, 2016.

\* cited by examiner

MOBILE COMMUNICATIONS SYSTEM, METHODS, CONTROLLER, RELAY NODE AND COMMUNICATIONS TERMINAL

CROSS-REFERENCE TO RELATED APPLICATIONS

The present application is based on PCT filing PCT/EP2016/058897 filed Apr. 21, 2016, and claims priority to European Patent Application 15 167 227.6, filed in the European Patent Office on May 11, 2015, the entire contents of each of which being incorporated herein by reference.

TECHNICAL FIELD OF THE DISCLOSURE

The present disclosure relates to mobile communications networks, methods, relay nodes and communications terminals, and more specifically to providing an arrangement in which a communications terminal communicates with a base station via a relay node.

Embodiments of the present technique can provide methods of communicating data in a small cell environment where relay nodes may be used.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a number of new infrastructure architectures involving a variety of classes of devices, of wireless access point units and of applications which may require different data rates, coverage areas or transmission powers. Unlike a conventional third or fourth generation communications device such as a smartphone, an MTC-type terminal is preferably relatively simple and inexpensive, having a reduced capability. Examples of recent developments include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include relay nodes which provide assistance to local terminal communicating with a base station.

Whilst it can be convenient to have different systems addressing different needs from different mobile network users, the additions of new infrastructure and new services can also create an infrastructure problem, which is not desirable in a mobile network.

With the continuous growth in data transmitted in mobile networks, continually increasing network capacity comparatively is a problem faced by the industry. There are three parameters which can be changed in order to increase Radio Access network capacity: higher spectral efficiency, more radio spectrum and denser cell layout. The two former of these have limitations on the expected gains over today's LTE, and certainly improvements on the order of magnitude or more are not possible. Thus, in order to meet the stated 1000× capacity targets, small cells are getting a lot of attention [1].

SUMMARY OF THE DISCLOSURE

According to an example embodiment of the present disclosure there is provided a mobile communications system comprising a base station, which is operatively coupled to a controller. The base station includes a transmitter and a receiver, the transmitter being configured to transmit signals via a wireless access interface to a plurality of relay nodes and to one or more communications terminals, and the receiver being configured to receive signals via the wireless access interface from the plurality of relay nodes and from the one or more communications terminals. The controller is configured to control a first relay node of the plurality relay nodes to transmit signals representing the data to one of the communications terminals for transmission to the base station or to receive signals representing the data from the communications terminal for transmission to the base station, wherein, upon first predetermined conditions being met, to control a second relay node of the plurality of relay nodes to transmit signals representing the data to the communications terminal received from the base station or to receive signals representing the data from the communications terminal for transmission to the base station, and to control the communications terminal to transmit a first signal representing at least a first part of the data to the first relay node for transmission to the base station, and to transmit a second signal representing at least a second part of the data to the second relay node for transmission to the base station.

When a communications terminal communicates via a relay node to an eNodeB, there are several potential issues. The first of these is that the communications terminal may have a poor connection to that relay node, or the relay node may be consuming too much power or dealing with too much traffic. The relay node is likely to be capacity limited, and if the amount of traffic being communicated between the communications terminal and the eNodeB via the relay node is greater than the relay node's capacity, it may become a bottleneck to the system, thereby increasing latency and delays, as well as wasting power and causing the mobile communications system to be more inefficient in general. The provision of a second relay node in order to alleviate the traffic or power load on a capacity constrained relay node, or a relay node which is communicating with a communications device via an instable or low quality channel, may provide a solution to some or all of these issues.

Embodiments of the present disclosure, then, can increase a communications bandwidth available to a communications terminal, for example where a relatively high amount of data needs to be communicated by a communications terminal to an eNodeB, or where the communications terminal may be out of coverage of the eNodeB. This may be achieved through the employment of a dual connection, with two relay nodes relaying signals between the communications terminal and the eNodeB. This in itself has its own challenges to overcome, and the present disclosure also reduces a likelihood or avoids a conflict in communications between the communications terminal and a relay node when more than one relay node is used.

Accordingly the first and second relay nodes may be arranged to form a dual connection between the communications terminal and the base station such that the capacity of the mobile communications system is increased, and the power consumed by a relay node than if it was relaying signals between the communications terminal and base station alone would be a lot lower. Further, an out-of-coverage communications terminal may not be able to communicate directly with the base station, and therefore relies on an associated relay node to relay communications. Should the radio communications channel between the communications terminal and the relay node be of a low quality or stability, communications will become severely affected. A second relay node, with which the communications terminal shares a better quality, more stable channel, may be required to be activated, so that it may relay signals between the base station and the out of coverage communications terminal.

Further, the traffic load of a relay node operating alone between a communications terminal and a base station may be greater than its capacity, thereby causing the relay node to become a bottleneck to the mobile communications system. In this case, latency would be increased and the mobile communications system would suffer delays, which would be problematic in time-critical scenarios such as video streaming etc. In order to reduce this latency, a second relay node could be activated to provide a dual connection implementation where the traffic load of a single relay node is alleviated.

Various further aspects and features of the present technique are defined in the appended claims, which include a mobile communications network comprising a base station, one or more relay nodes and one or more communications terminals, a method of operating a base station as a network controller, a base station forming part of a mobile communications network, circuitry for a base station forming part of a mobile communications network, a relay node forming part of a mobile communications network, circuitry for a relay node forming part of a mobile communications network, a communications terminal forming part of a mobile communications network, and circuitry for a communications terminal forming part of a mobile communications network.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
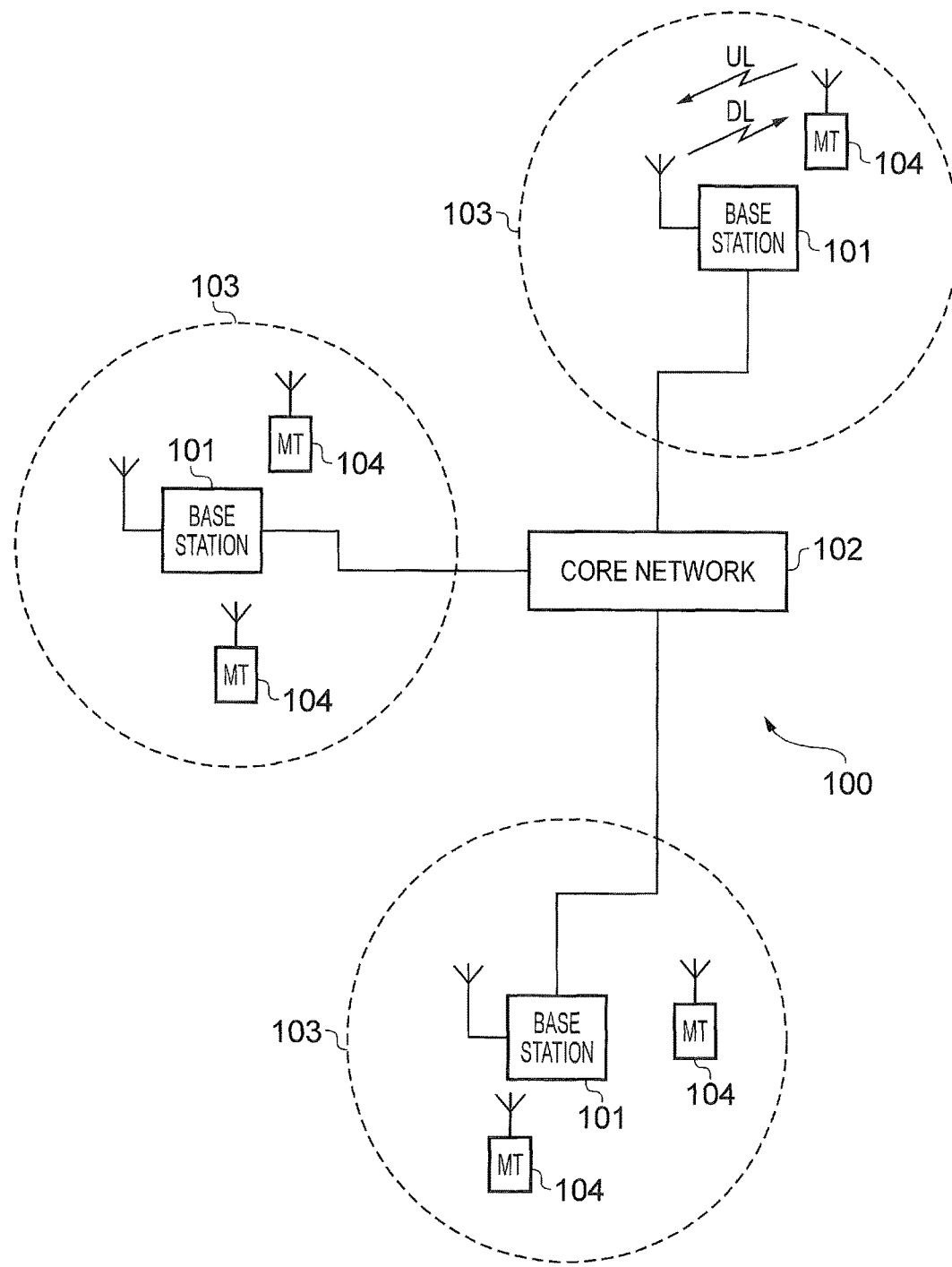
FIG. 1 provides a schematic diagram of a mobile communications system according to an example of an LTE standard.

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

FIG. 1 provides a schematic diagram illustrating some basic functionality of a conventional mobile telecommunications network, using for example a 3GPP defined UMTS and/or Long Term Evolution (LTE) architecture. The mobile telecommunications network/system 100 of FIG. 1 operates in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [2]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licensed for use by the operator of the network 100. The core network 102 routes data to and from the terminal devices 104 via the respective base stations 101 and provides functions such as authentication, mobility management, charging and so on. The terminal devices may also be referred to as mobile stations, user equipment (UE), user terminal, mobile terminal, mobile device, terminal, mobile radio, and so forth. Base stations may also be referred to as transceiver stations/nodeBs/e-nodeBs/eNodeB, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 101 of FIG. 1 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 101 may be realized as any other types of base stations such as a NodeB and a base transceiver station (BTS). The base station 101 may include a main body (that is also referred to as a base station apparatus) configured to control radio communication, and one or more remote radio heads (RRH) disposed in a different place from the main body. In addition, various types of terminals, which will be described below, may each operate as the base station 101 by temporarily or semi-persistently executing a base station function.

Any of the communications devices 104 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications device 104 may also be realized as a terminal (that is also referred to as a machine type communication (MTC) terminal) that performs machine-to-machine (M2M) communication. Furthermore, the terminal apparatus 104 may be a radio communication module (such as an integrated circuit module including a single die) mounted on each of the terminals.

In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small can therefore be the cell or coverage provided by a small cell base station. In other examples, the term small cell can also refer to a component carrier when more than one component carrier is available.

Figure 2:
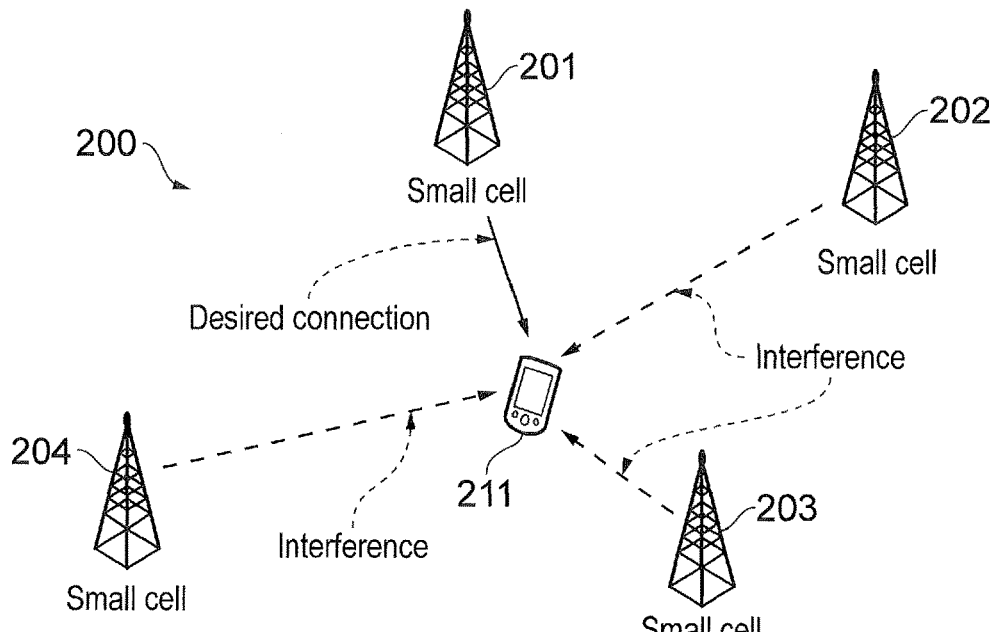
FIG. 2 schematically illustrates an example of a small cell environment.

FIG. 2 illustrates an example of a small cell environment 200 wherein a plurality of base stations 201 to 204 are operable to communicate with terminals, such as terminal 211. In this example, the terminal 211 is in communication with base station 201 providing a first small cell but is within the range of the small cell for each of base stations 202, 203 and 204. As a result, the signals sent by base station 201 to terminal 211 can suffer from interference from signals transmitted by base stations 202 to 204. While with conventional macrocell networks the same type of situation would also be likely, in practice, the mobile operator is in a position to carry out frequency planning, distributing frequencies amongst base stations in a static or dynamic manner. Accordingly, the level of interference can be significantly reduced for macrocells. On the other hand, when dealing with a small cell network, there may be a potentially very large number of base stations, each using different powers such that network planning becomes much more difficult, and the complexity also increases with the number of active small cells in an area. In particular, if a large number or small cells are available in an area, it is likely that they will not be able to each be allocated a different, non-overlapping frequency bands such that transmissions from different cells would not interfere with each other. Moreover, small cell networks have the additional difficulty that a small cell may be mobile, i.e. not stationary, while network planning for a macrocell or legacy femto/picocells was generally based on stationary or fixed base stations. This also increases the complexity of trying to reduce interference significantly. Of course, interference between small cells can be significant when the number of deployed small cells increases such that in a dense small cell environment, interference reduction can be challenging. As a result, in the event that the interference affects synchronization signals or reference signals of small cells, terminals may not even be able to discover and connect to small cells.

Figure 3:
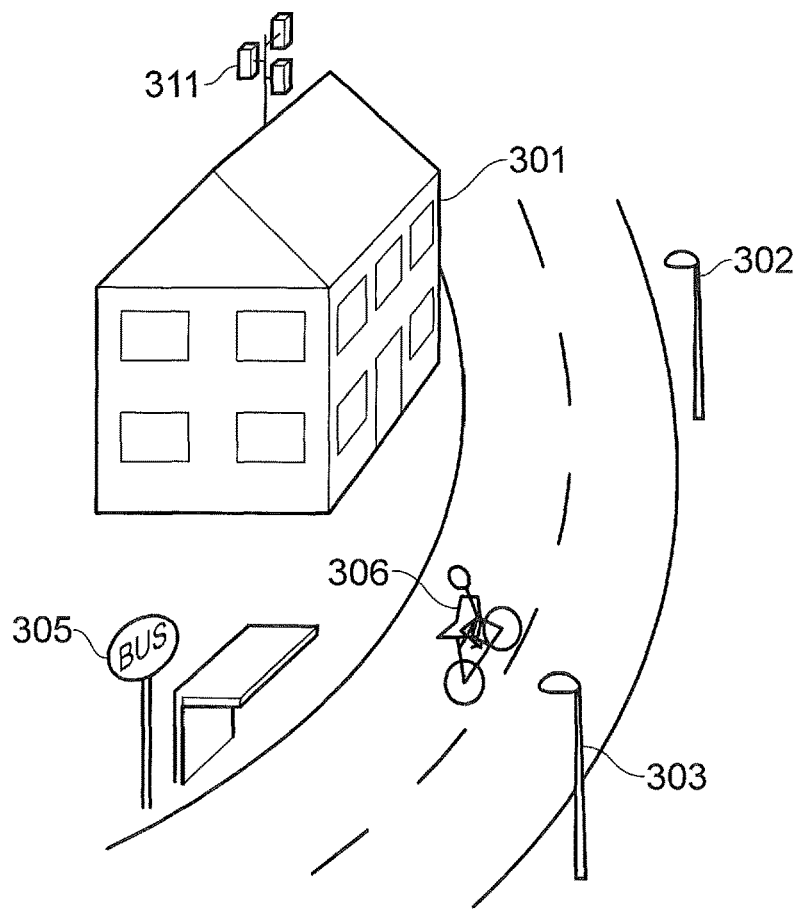
FIG. 3 illustrates another example of a small cell environment.

An example of a small cell environment 300 is illustrated in FIG. 3, where a macrocell base station 311 is provided in the same area as small cells provided by a base station 301 in or in the vicinity of a building, by a base station 302 in a first lamppost, by a base station 303 in a second lamppost, by a base station 305 provided in a bus stop and by a mobile base station 306 provided in a cyclist back-pack. In this example, the planning for interference may vary depending on traffic and on time. For example a cyclist may enter an interference zone this zone. However, the base station 301, if serving an office, may potentially only be used during office hours and may be turned off during the rest of the day or the rest of the week. A variety of base stations may thus be providing a small or macro cell and the base station may have very different profile regarding time of use, frequency capabilities, power/range, additional functionalities, etc.

Figure 4:
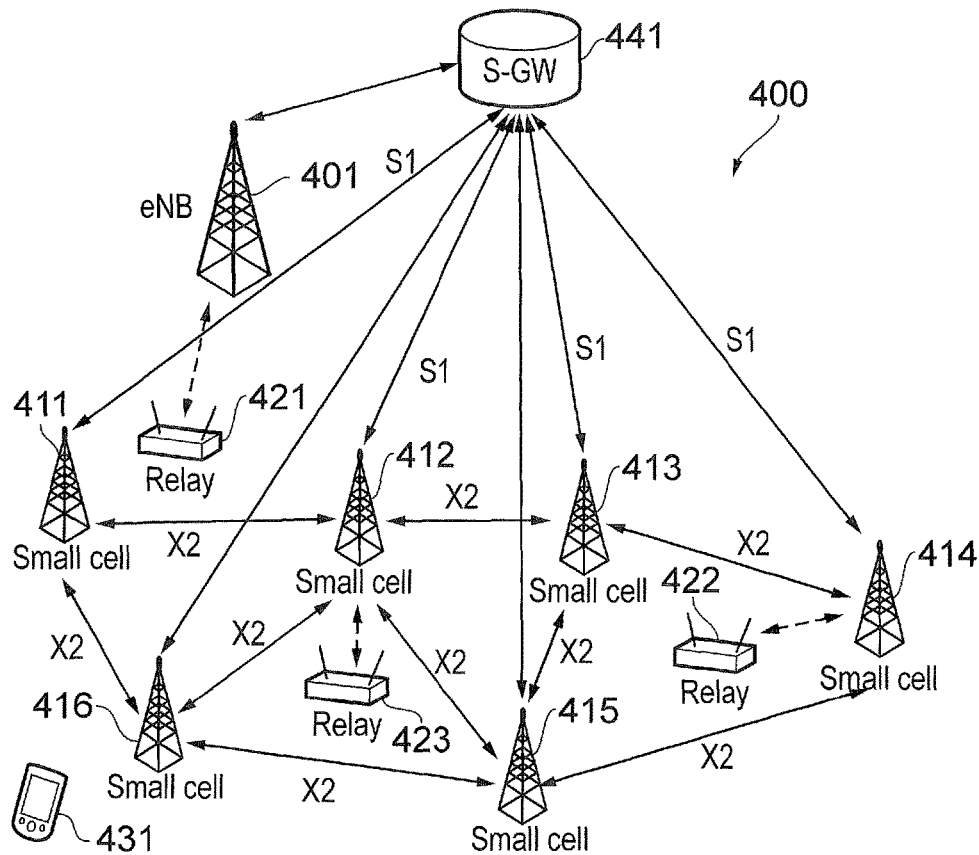
FIG. 4 illustrates an example system for communicating with at least a terminal in a heterogeneous network.

Moreover, mobile networks can also include relay nodes which can further increase the complexity of the mobile system and of the reduction of interference in a small cell network. FIG. 4 illustrates an example system 400 for communicating with at least a terminal 431. In this system 400, a base station 401 provides a macrocell and six base stations 411 to 416 provide small cell coverage, potentially overlapping with the coverage of the base station 401. Additionally, three relay nodes 421 to 423 are provided and are operating with base stations 401, 414 and 412, respectively. A relay node can generally be defined as a wireless radio access point for relaying transmission and which thus does not implement all of the functionalities of a base station. It is in general not directly connected to the core network but uses wireless access (inband or outband) for backhaul link to connect with a base station. In other examples, a backhaul link may also be provided over a wired connection. This is in contrast to a small cell base station which, as mentioned above, can generally operate like a base station and is thus connected to the core network, as illustrated by the arrows between the small cell base stations 411 to 416 and the Serving Gateway "S-GW" in FIG. 4. Relay nodes may also send or receive data with the terminals or base stations, forming an ad-hoc network which can also add to the complexity of dealing with interference in an environment as illustrated in FIG. 4.

Relay technologies are known generally to provide an arrangement for receiving signals from a base station and for retransmitting the received signals to a user equipment (UE, a communications terminal) in a mobile communications network, or to receive signals transmitted from a UE for re-transmission to a base station of a mobile communications network. The aim of such relay nodes is to try to extend a radio coverage area provided by a mobile communications network to reach communications devices which would otherwise be out of range of the mobile communications network or to improve the ratio of successful transmissions between a terminal and a base station.

If two relay nodes are employed between a UE and a base station, it is possible to set up a dual connection. This may be advantageous in terms of saving or balancing power consumption between relay nodes. Additionally, traffic may be balanced between relay nodes, and a relay node at which a large amount of data may be received and transmitted could avoid becoming a bottleneck for the network, thereby increasing latency and delays. The overall advantageous effect of employing a dual relay connection between a UE and a base station then, is to increase the overall efficiency of the network.

Dual Relay Node Connection

Figure 5:
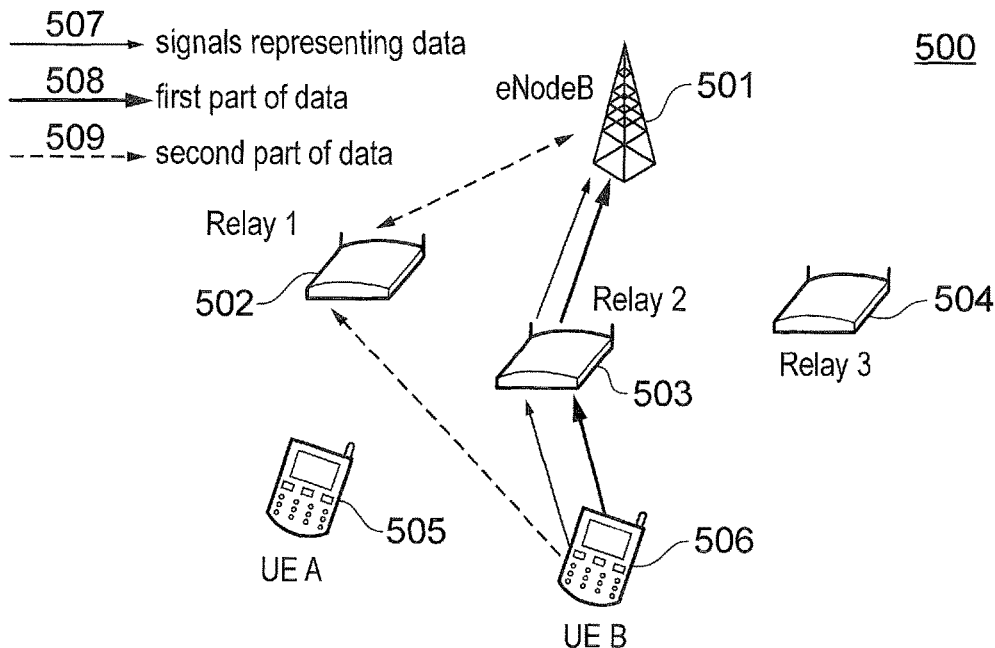
FIG. 5 illustrates an example mobile communications system in accordance with the present technique.

According to an example embodiment of the present disclosure there is provided a mobile communications system comprising a base station, which is operatively coupled to a controller. The base station includes a transmitter and a receiver, the transmitter being configured to transmit signals via a wireless access interface to a plurality of relay nodes and to one or more communications terminals, and the receiver being configured to receive signals via the wireless access interface from the plurality of relay nodes and from the one or more communications terminals. The controller is configured to control a first relay node of the plurality relay nodes to transmit signals representing the data to one of the communications terminals or to receive signals representing the data from the communications terminal, wherein, upon first predetermined conditions being met, to control a second relay node of the plurality of relay nodes to transmit signals representing the data to the communications terminal received from the base station or to receive signals representing the data from the communications terminal for transmission to the base station, and to control the communications terminal to transmit a first signal representing at least a first part of the data to the first relay node for transmission to the base station, and to transmit a second signal representing at least a second part of the data to the second relay node for transmission to the base station. FIG. 5 illustrates an example mobile communications system 500 in accordance with an arrangement of the present disclosure.

The system comprises an eNodeB 501, which may serve as the network controller, three relay nodes 502, 503 and 504, and two mobile communications terminals, or UEs 505 and 506, all of which are served by the eNodeB 501. The eNodeB comprises a transmitter configured to transmit data across a wireless access interface to the UEs 505 and 506 and the relay nodes 502, 503 and 504, and a receiver configured to receive data from the UEs 505 and 506 and the relay nodes 502, 503 and 504 in return.

The UE B 506 is configured to transmit signals representing data 507 to the eNodeB 501 via the relay node 503. It may later be decided by the network controller, or requested by the UE B 506 that a second relay node is required to relay some of the traffic from the UE B 506 to the eNodeB 501. In this case, the UE B 506 is considered to transmit a first signal 508 representing at least a first part of the data to one relay node 503, and a second signal 509 representing at least a second part of the data to another relay node 502. Both relay nodes 502 and 503 will then transmit the signals representing a part of the data 508 and 509 that they received from the UE B 506 to the eNodeB 501.

There are multiple approaches as to how a dual connection may be implemented. One such method is the employment of carrier aggregation. At least a part of the data may be modulated with a first carrier signal, and at least part of the data may be modulated with a second carrier signal, and these signals may be transmitted independently.

Figure 6:
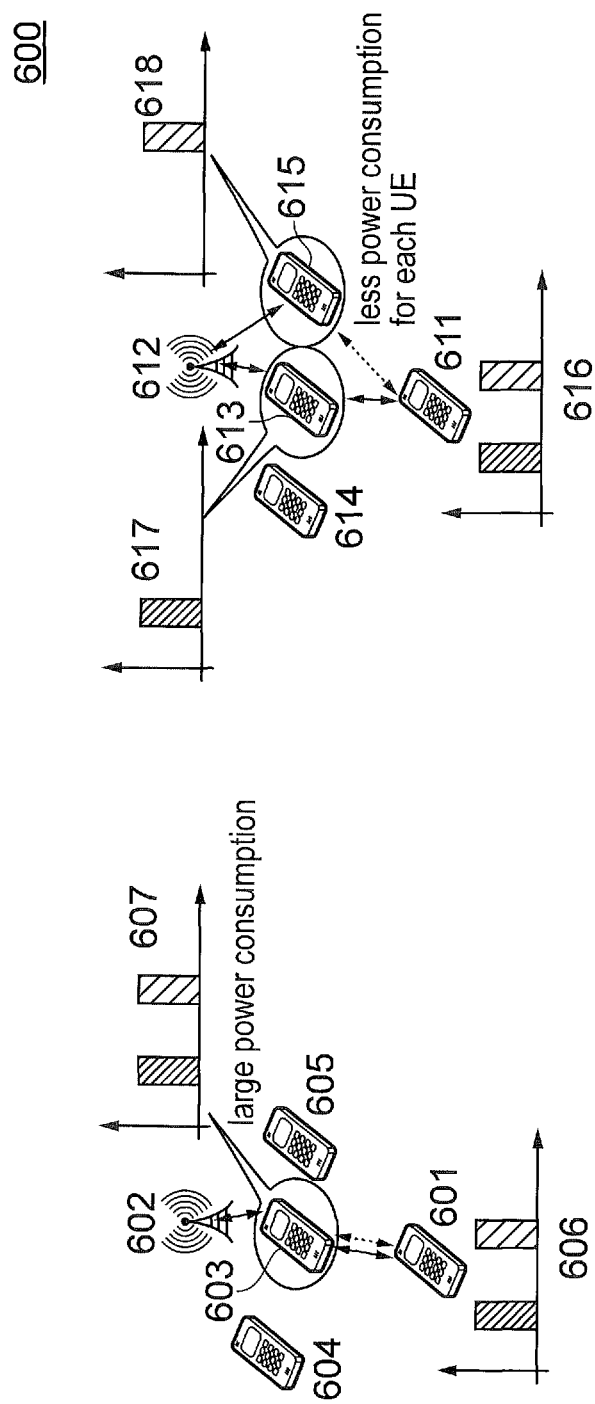
FIG. 6 illustrates an example of carrier aggregation as an example method of implementing a dual relay connection in accordance with the present technique.

FIG. 6 shows an example of carrier aggregation 600 using separate carrier signals as an example method of implementing a dual relay connection in accordance with the present technique. In the first image, a UE 601 transmits signals 606 to and receives signals 606 from a relay node 603 of a plurality of relay nodes 603, 604 and 605. The signals 606 comprise a primary component carrier (PCC) and secondary component carrier (SCC). The relay node 603 in turn transmits the same signals 606 to and receives the same signals 606 from a base station 602. However, the power consumption at the relay node 603 in this scenario will be high, and it may be the case that the network decides it is more efficient to implement a dual connection.

In the case that a dual relay connection is implemented, in the second image, a UE 6011 transmits signals 616 to and receives signals 616 from two relay nodes 613 and 615 of a plurality of relay nodes 613, 614 and 615. The first relay node 613 relays the PCC signal 617 to the base station 612, while the second relay node 615 relays the SCC signal 618 to the base station 612. In this scenario, less power is consumed by each of the relay nodes 613 and 615 than if they were not operating with a UE with a dual connection.

Figure 7:
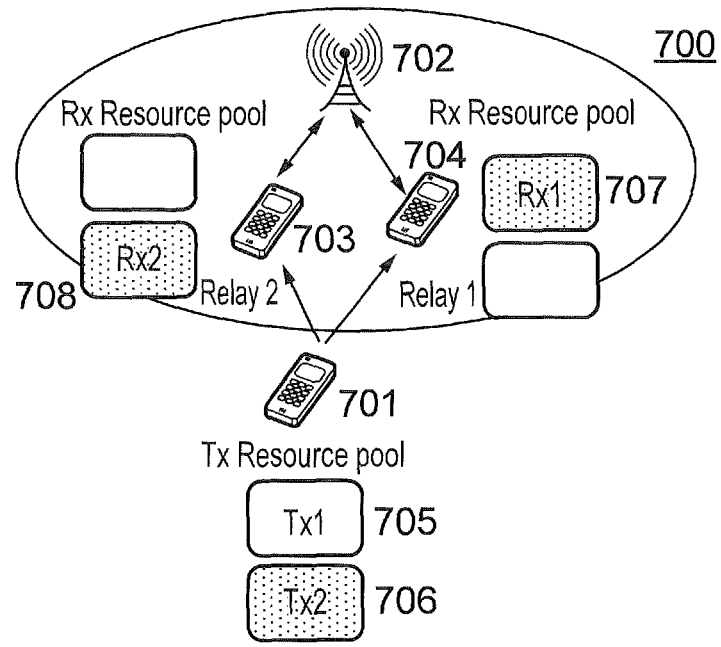
FIG. 7 illustrates an example of separate communications resource pools as an example method of implementing a dual relay connection in accordance with the present technique.

FIG. 7 shows an example of separate communications resource pools 700 as an example method of implementing a dual relay connection in accordance with the present technique. A UE 701 is configured to transmit two signals, each representing a part of overall data to be transmitted, to two relay nodes 703 and 704 for transmission to a base station 702. The two signals are transmitted in separate resource pools Tx1 and Tx2. The resource pools may be separated, for example, in time, or in frequency, etc. The first relay 704 is configured to receive the first signal in the first resource pool Rx1, and the second relay 703 is configure to receive the second signal in the second resource pool Rx2. These signals are then transmitted on to the base station 702 by the relay nodes 703 and 704. Each relay node is only configured to monitor signals in the resource pool configured for it, and ignore signals in the resource pool configured for the other relay node. For downlink communications, it is not necessary to worry about the distinction between relay nodes, and so only one resource pool is required.

In the case of employing separate communications resource pools for implementing a dual relay node connection, the configuration of the resource pools may be shared. For downlink communications, the relay nodes may configure the transmission (Tx) resource pools, and the UE may configure the receiver (Rx) resource pools. If the uplink traffic load is high, the configuration of resource pools may also be carried out for uplink communications. In this case, the relay nodes may configure the Rx resource pools and the UE may configure the Tx resource pools. The drawback of such a configuration is that more communications resources are used up, and the UE may consume additional power. However, it provides the advantageous effects of reducing power consumption and traffic load for each of the relay nodes, and only one carrier signal is required. Appropriately, it is beneficial to deactivate the second relay node when it is not required in order to save power consumption and communications resources.

A further approach as to how a dual connection may be implemented may be to configure the relay nodes with different device-to-device (D2D) identifiers.

In a first example embodiment of the present disclosure, it is the eNodeB, acting as the network controller, which leads the activation and deactivation of the second relay node. In this first example embodiment, the necessity of the second relay node connection is dependent on the traffic load. The eNodeB scheduler is aware of the current level of traffic load (for example, by looking at the buffer sizes), and this information may be used for making the decisions regarding the activation and deactivation of the second relay node.

Figure 8:
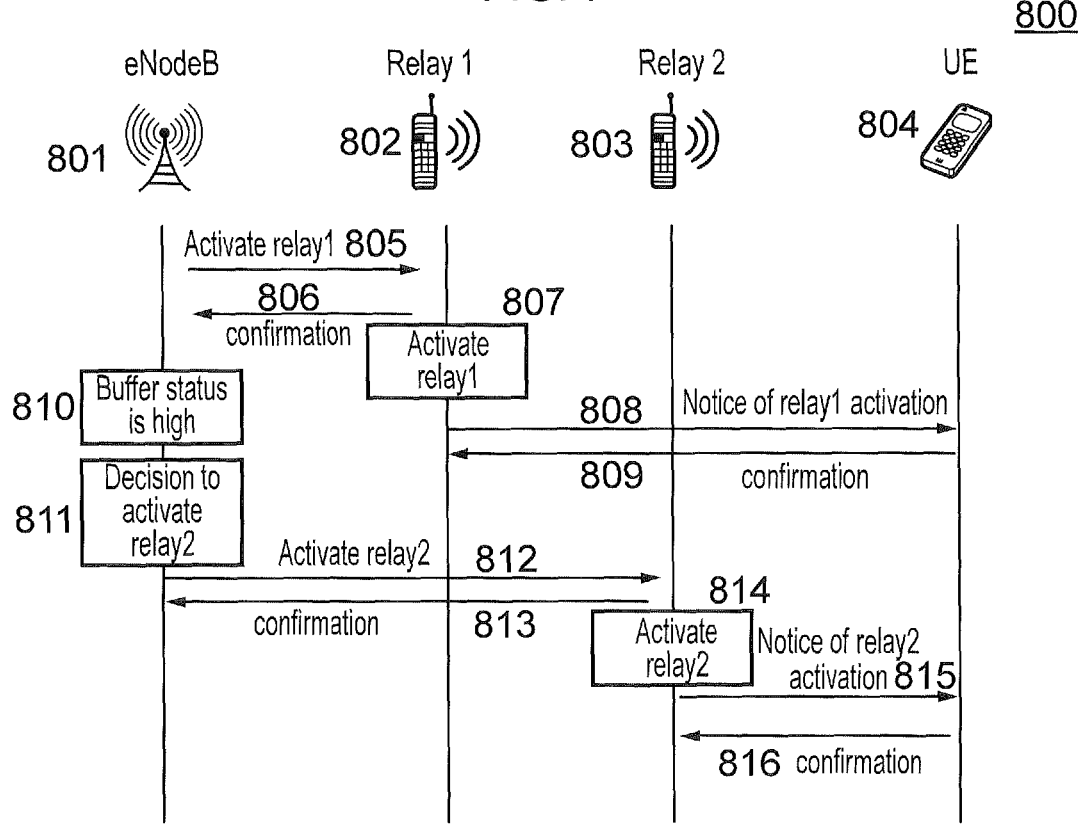
FIG. 8 illustrates an example of the activation of a dual relay connection by a base station in accordance with the present technique.

FIG. 8 shows how the activation of a dual relay node connection 800 may be carried out by an eNodeB in accordance with the first example embodiment of the present disclosure. Initially, the eNodeB sends a command to activate the first relay node, so that it may relay signals between the UE and the eNodeB. The first relay node sends a confirmation that it has received this command, activates and configures the Tx/Rx resource pools, and sends a notice to the UE that it is available as a relay node. Alternatively, the notice to the UE may be provided by the eNodeB. The UE sends a confirmation that it has received this notice, and the first relay node begins transmitting and receiving data messages from the UE and from the eNodeB.

At a point later in time, the eNodeB scheduler may determine that the buffer status of the first relay node is high, and there is a lot of traffic being handled by it. Alternatively, the eNodeB scheduler may detect the high traffic load through a scheduling request. The eNodeB may then decide that a second relay node should be activated in order to alleviate the high traffic load of the first relay node, and so selects the second relay node from among one or more candidate relay nodes. The eNodeB may then send an activation command to the second relay node, and receive a confirmation from the second relay node that this has then been received. The second relay node is now activated and may relay signals between the UE and eNodeB, and the UE is notified of this by either the second relay node or the eNodeB.

Figure 9:
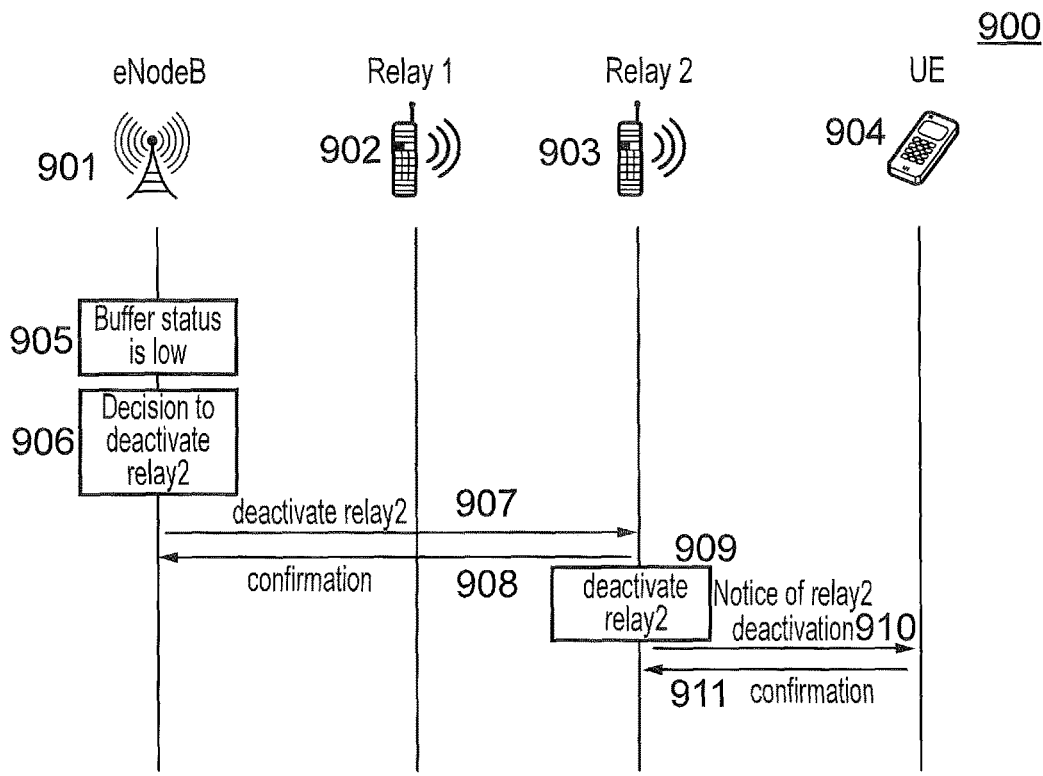
FIG. 9 illustrates the concept of the deactivation of a dual relay connection by a base station in accordance with the present technique.

FIG. 9 shows how the deactivation of a dual relay node connection 900 may be carried out by an eNodeB in accordance with the first example embodiment of the present disclosure. Initially, it is assumed that the eNodeB has already activated a first relay and a second relay node as described with reference to FIG. 8 above, so that both the first relay node and the second relay node are operating with a dual connection to a UE, relaying signals between the UE and the eNodeB.

At some point, the eNodeB scheduler may determine that the buffer status of the second relay node is low, and there is a low level of traffic being handled by it. Alternatively, the eNodeB scheduler may detect the low traffic low through a scheduling request. The eNodeB may then decide that a dual connection is no longer required, and may then send a deactivation command to the second relay node. The second relay node may send a confirmation message to the eNodeB, at which point it becomes deactivated. The UE may then be notified of the deactivation by either the second relay node or the eNodeB.

For both the activation and deactivation procedures as described with reference to FIGS. 8 and 9 in accordance with the first example embodiment of the present disclosure, the connection between the UE and the first relay node should be separated from that of the connection between the UE and the second relay node. As described, this may be achieved through a number of methods, including but not limited to employing a carrier aggregation implementation, separated communications resource pools, or different D2D identifiers for each of the first and second relay nodes.

For both the activation and deactivation procedures as described with reference to FIGS. 8 and 9 in accordance with the first example embodiment of the present disclosure, the example trigger condition used for the activation or deactivation of the second relay node is the traffic load of the relay nodes. There are a number of possible trigger conditions that may be used for the activation or deactivation of a second relay to form or terminate a dual connection, and these include but are not limited to the following:

An example trigger condition may be the status of a buffer. The eNodeB scheduler has a perfect knowledge of the buffer status of relay nodes and UEs in the network for downlink communications. In addition, the eNodeB scheduler may know the buffer status of the relay nodes and UEs based on feedback signalling, e.g. a buffer status report. The buffer status as a trigger condition may be handled per channel, per bearer (where it is assumed that one connection between a UE and relay node has one bearer between the relay node and eNodeB) or per UE. The buffer status may also be handled per relay, in terms of aggregated traffic which is discussed below.

A second example trigger condition may be the inactivity of traffic. Typically, packet traffic arrives in bursts, and is not transmitted or received at a continuous rate. The eNodeB may be equipped with a timer to measure the inactivity of traffic, and when this timer expires, the eNodeB may deactivate the second relay node. Accordingly, in the contrasting scenario where traffic activity is detected over a period of time measured by the eNodeB's timer, the eNodeB may activate the second relay node. This measurement and timer could be applicable for uplink and downlink communications separately.

A third example trigger condition may be the power headroom (PHR). The eNodeB knows the allocated power of the channel or bearer, similarly to logical channels (which are determined by the information carried within a physical channel). The power headroom is an indirect indicator of the traffic load. A small level of power headroom of the first relay node (i.e. the difference between the transmission power available to the first relay node and the current amount of power being consumed by the first relay node) may be the trigger condition in this case to activate the second relay node to implement a dual connection. In addition to being controlled from the eNodeB side of the communications system, the power headroom for a relay node or UE may be alternatively reported from the relay node or UE it concerns to the eNodeB.

A fourth example trigger condition may be a traffic load trigger, but based on aggregated traffic among relay nodes and UEs rather than the traffic load of an individual relay node or UE. The first relay node may treat the traffic coming through it as having been transmitted by more than one UE, and has the limitation of maximum throughput between the relay node and eNodeB. In order to avoid becoming a bottleneck to the communications system, and thereby increasing latency and delays, the first relay node may need to be joined by a second relay node in relaying signals from the first relay node's serving UE or UEs. The process begins with a new UE becoming associated with the first relay node, and communicating with it. The eNodeB may estimate the total traffic of the first relay node after the new UE has become associated with it, and dependent on this traffic, the eNodeB may decide to activate the second relay node. It is possible, if necessary, for the eNodeB to activate the second relay node for a second UE which has not itself yet activated the second relay node. The eNodeB may then control traffic, by restricting the level of traffic being communicated via the first relay node and offloading some of the traffic to be communicated via the second relay node.

A fifth example trigger condition may be the quality of the channel, in terms of coverage stability. If the UE faces unstable channel quality between itself and a first relay node with which it is associated, a second relay node, with which the UE shares a higher quality, more stable channel, may be activated.

In a second example embodiment of the present disclosure, it is the UE which leads the activation and deactivation of the second relay node, by detecting a high or low load of traffic and transmitting request messages to the eNodeB for the activation or deactivation of the second relay node. In this second example embodiment, the necessity of the second relay node connection is dependent on the traffic load. The UE has a perfect knowledge of the buffer status for uplink communications, so this embodiment of the present disclosure may be advantageous for applications such as uploading large video files or streaming video applications from a camera.

Figure 10:
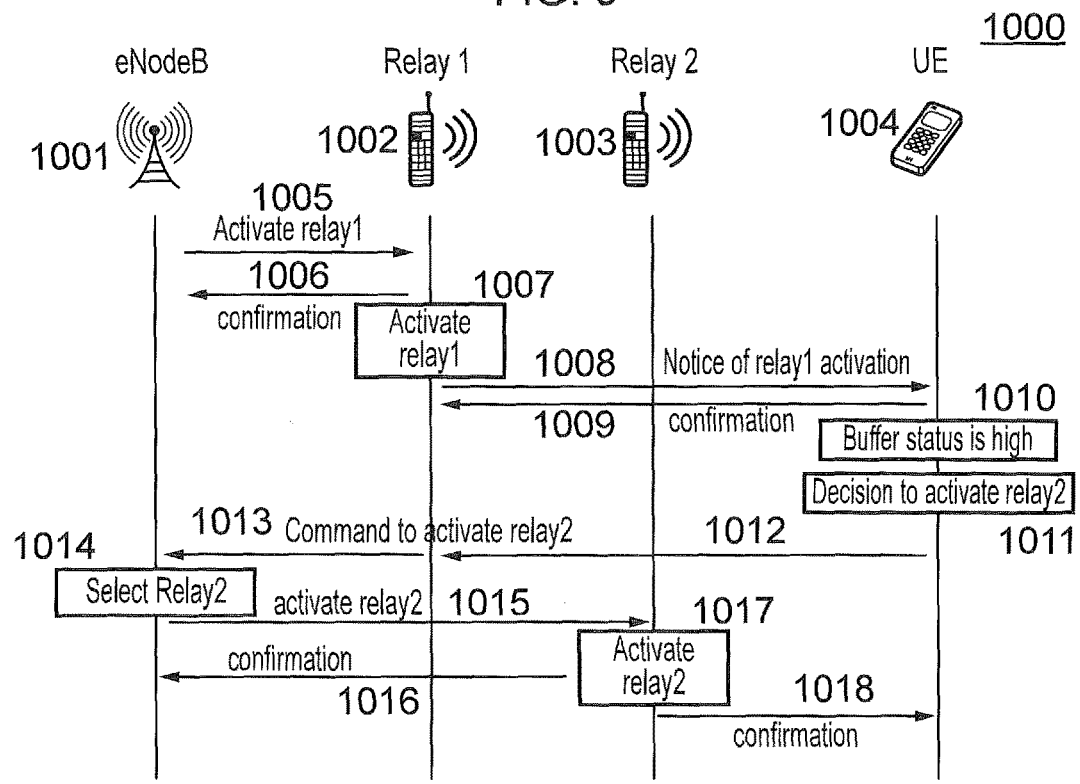
FIG. 10 illustrates an example of the activation of a dual relay connection by a communications terminal in accordance with the present technique.

FIG. 10 shows how the activation of a dual relay node connection 1000 may be carried out by a UE in accordance with the second example embodiment of the present disclosure. Initially, the eNodeB sends a command to activate the first relay node, so that it may relay signals between the UE and the eNodeB. The first relay node sends a confirmation that it has received this command, activates and configures the Tx/Rx resource pools, and sends a notice to the UE that it is available as a relay node. Alternatively, the notice to the UE may be provided by the eNodeB. The UE sends a confirmation that it has received this notice, and the first relay node begins transmitting and receiving data messages from the UE and from the eNodeB.

At a point later in time, the UE may determine that the buffer status of the first relay node is high, and there is a lot of traffic being handled by it. The UE may then decide that a second relay node should be activated in order to alleviate the high traffic load of the first relay node, and so sends an activation command to the eNodeB via the first relay node. The eNodeB may then send an activation command to the second relay node, and receive a confirmation from the second relay node that this has then been received. The second relay node is now activated and may relay signals between the UE and eNodeB, and the UE is notified of this by either the second relay node or the eNodeB.

Figure 11:
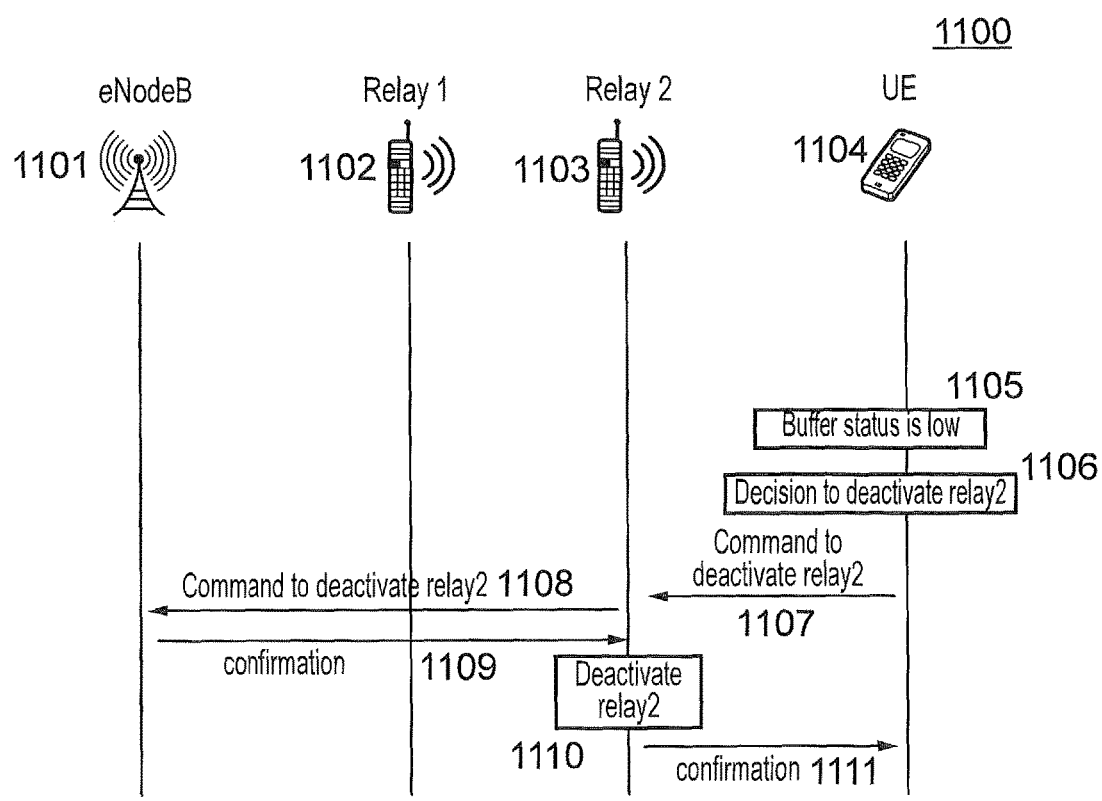
FIG. 11 illustrates the concept of the deactivation of a dual relay connection by a communications terminal in accordance with the present technique.

FIG. 11 shows how the deactivation of a dual relay node connection 1100 may be carried out by a UE in accordance with the second example embodiment of the present disclosure. Initially, it is assumed that the eNodeB has already activated a first relay and a second relay node as described with reference to FIG. 10 above, so that both the first relay node and the second relay node are operating with a dual connection to a UE, relaying signals between the UE and the eNodeB.

At some point, the UE may detect that the buffer status of the second relay node is low, and there is a low level of traffic being handled by it. The UE may then decide that a dual connection is no longer required, and may then send a deactivation command to the eNodeB via the first relay node. The second relay node may send a confirmation message to the eNodeB, at which point it becomes deactivated. The UE may then be notified of the deactivation by either the second relay node or the eNodeB.

For both the activation and deactivation procedures as described with reference to FIGS. 10 and 11 in accordance with the second example embodiment of the present disclosure, the connection between the UE and the first relay node should be separated from that of the connection between the UE and the second relay node. As described, this may be achieved through a number of methods, including but not limited to employing a carrier aggregation implementation, separated communications resource pools, or different D2D identifiers for each of the first and second relay nodes.

For both the activation and deactivation procedures as described with reference to FIGS. 10 and 11 in accordance with the second example embodiment of the present disclosure, the example trigger condition used for the activation or deactivation of the second relay node is the traffic load of the relay nodes. There are a number of possible trigger conditions that may be used for the activation or deactivation of a second relay to form or terminate a dual connection, as have been discussed with regard to the first example embodiment of the present disclosure and FIGS. 8 and 9.

A mobile communications system operating in accordance with the present disclosure holds a number of advantages. With regard to the scenario in which the eNodeB controls the activation and/or deactivation of the second relay node, as in the first example embodiment described above, there are several advantages in that: the eNodeB scheduler has a perfect knowledge of the buffer status of traffic for downlink communications, the eNodeB can be aware of the traffic through a relay node not only for a specific UE but for other UEs as well, and therefore can be aware of the aggregated traffic through that relay node, and the eNodeB may also be in charge of the final decision of the activation of a second relay node based on comprehensive information. With regard to the scenario in which the UE controls the activation and/or deactivation of the second relay node, as in the second example embodiment described above, there are also advantages in that: the UE has a perfect knowledge of the buffer status of traffic for uplink communications, and the UE knows or is able to measure the internal status of the UE, for example the power headroom.

A further advantage held by a mobile communications system operating in accordance with the present disclosure is that the employment of more than one relay node between a UE and an eNodeB will result in less power being consumed by each relay node than if they were operating individually between the UE and the eNodeB. This is not an overly advantageous effect in itself as the overall power consumed is not any lower; indeed it is higher as power is consumed for the establishment of radio communications links for the second relay node and the configuration of separate communications resource pools should that be the method of relay node separation. However, should the power headroom of the first relay node be very small, to the detriment of the performance of the mobile communications system, then the employment of a second relay node becomes advantageous.

An additional advantage based on the above advantage comes about in terms of deactivation of the second relay node should the combined transmission power consumed by both relay nodes be low enough that the power headroom for a single relay node would be sufficiently large. In this case, when there is no disadvantage to using a single relay node between the UE and eNodeB in terms of power headroom, the UE/relay node saving power in terms of the configuration of separate communications resource pools and configuration of the second relay node would be an advantage. Clearly operating two relay nodes in a dual connection will always be advantageous to the mobile communications system in terms of capacity, but not necessarily power. Often it may be a trade off between the two with regard to the activation or deactivation of a second relay node to implement a dual connection.

A yet further advantage held by a mobile communications system operating in accordance with the present disclosure is with regard to the traffic balancing between relay nodes. The eNodeB has information on aggregated traffic of relay nodes, which are served by the eNodeB. The eNodeB may decide to balance the traffic among relays, and activate or deactivate the second relay node if necessary. This provides the advantageous effect that the traffic bottlenecking of a specific relay node can be avoided, thereby decreasing latency and delays.

A dual relay node connection could be provided between a UE and an eNodeB if, for example, the capabilities of the relay nodes were different. The first relay node may be, for example, of an MTC capability, designed to transmit and receive frequent signals of low power and bandwidth, while the second relay node may be of a capability designed for applications such as uploading large video files or streaming video applications from a camera. It may also be the case that different UEs or relay nodes support different frequency bands, and a second relay node may need to be activated to operate in a dual connection when communicating in that band.

In accordance with the present disclosure, all example embodiments described are based on a dual connection comprising of a base station or eNodeB, a UE and two relay nodes. However, mobile communications systems operating in accordance with the present disclosure are not limited to having two relay nodes, or even limited to having a UE operating with two relay nodes with a dual connection. It would be perfectly possible to expand the idea in the same way to operate with a triple relay node connection.

Further, it is not necessary for a UE and a relay node as described to be distinctly separate entities. A UE operating as a UE to network relay in D2D may have a relay function which can be activated if necessary. Therefore, it is within the scope of the present disclosure for the UE and the relay node to be physically the same product.

In the present disclosure, the term infrastructure unit aims to refer to any network node in the radio access network which can be found on the part from a source terminal (excluded) to a base station (included). It is noteworthy that although conventional terminals operating in a legacy network are unlikely to be considered as an infrastructure unit, in some examples, such as in some D2D cases, a terminal may sometimes be considered as an infrastructure unit, for example if it relays data or transmissions from other terminals to a base station (directly or indirectly). This term can thus include a base station for a macrocell, a base station for a small cell, a femtocell, a picocell, a relay node (operating in uplink and/or downlink), a terminal providing connectivity to one or more further terminals, etc.

As used herein, transmitting information or a message to an element may involve sending one or more messages to the element and may involve sending part of the information separately from the rest of the information. The number of "messages" involved may also vary depending on the layer or granularity considered.

In accordance with the present disclosure, when an uplink only relay node relays uplink signals, it may transmit relayed signals to the base station via one or more nodes (where the relayed signals are based on the received first uplink signals). For example, the signals may be transmitted to the base station via one or more relay nodes where some or all of them may be operating in one of an uplink-only mode or an uplink-and-downlink mode.

It is noteworthy that even though the present disclosure has been discussed in the context of LTE, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

Various further aspects and features are defined in the following numbered paragraphs:

Paragraph 1. A mobile communications system comprising
  a base station, the base station including a transmitter and
    a receiver, the transmitter being configured to transmit
    signals via a wireless access interface to a plurality of
    relay nodes and to one or more communications terminals, and the receiver being configured to receive
    signals via the wireless access interface from the plurality of relay nodes and from the one or more communications terminals, and
  a controller operatively coupled to the base station and
    configured
  to control a first relay node of the plurality relay nodes to
    transmit signals representing the data to one of the
    communications terminals received from the base station or to receive signals representing the data from the
    communications terminal for transmission to the base
    station, wherein,
  upon first predetermined conditions being met, to control
    a second relay node of the plurality of relay nodes to
    transmit signals representing the data to the communications terminal received from the base station or to
    receive signals representing the data from the communications terminal for transmission to the base station,
    and
  to control the communications terminal to transmit a first
    signal representing at least a first part of the data to the
    first relay node for transmission to the base station, and
    to transmit a second signal representing at least a
    second part of the data to the second relay node for
    transmission to the base station.

Paragraph 2. A mobile communications system according to
  paragraph 1, wherein the controller is configured
  upon second predetermined conditions being met, to
    control the second relay node not to transmit signals to
    the communications terminal and not to receive signals
    from the communications terminal, such that the communications terminal is associated only with the first
    relay node, and
  to control the communications terminal to transmit a
    signal representing the data to the first relay node for
    transmission to the base station.

Paragraph 3. A mobile communications system according to paragraph 1 or 2, wherein the controller is configured to control the first relay node to transmit signals to the communications terminal via a first carrier signal and to receive signals from the communications terminal via the first carrier signal and to control the second relay node to transmit signals to the communications terminal via a second carrier signal and to receive signals from the communications terminal via the second carrier signal.

Paragraph 4. A mobile communications system according to paragraphs 1 or 2, wherein the controller is configured to control the first relay node to transmit signals to the communications terminal in first communications resources and to receive signals from the communications terminal in the first communications resources and to control the second relay node to transmit signals to the communications terminal in second communications resources and to receive signals from the communications terminal in the second communications resources.

Paragraph 5. A mobile communications system according to paragraphs 1 or 2, wherein the controller is configured to assign a first identifier to the first relay node and a second identifier to the second relay node.

Paragraph 6. A mobile communications system according to any of paragraphs 1 to 5, wherein the first predetermined conditions include an amount of data being transmitted or received by the first relay node being above a predetermined threshold.

Paragraph 7. A mobile communications system according to any of paragraphs 1 to 6, wherein the first predetermined conditions include an amount of power being consumed by the first relay node being above a predetermined threshold.

Paragraph 8. A mobile communications system according to any of paragraphs 1 to 7, wherein the first predetermined conditions include an indication that the difference between a first amount of data being transmitted or received by the first relay node and a second amount of data being transmitted or received by the second relay node being above a predetermined threshold.

Paragraph 9. A mobile communications system according to any of paragraphs 1 to 8, wherein the first predetermined conditions include an indication that a communications link between the second relay node and the communications terminal and/or base station being of a higher quality than a communications link between the first relay node and the communications terminal and/or base station.

Paragraph 10. A mobile communications system according to any of paragraphs 1 to 9, wherein the second predetermined conditions include an indication that an amount of data being transmitted or received by the first relay node being below a predetermined threshold.

Paragraph 11. A mobile communications system according to any of paragraphs 1 to 10, wherein the second predetermined conditions include an indication that an amount of power being consumed by the first relay node being below a predetermined threshold.

Paragraph 12. A mobile communications system according to any of paragraphs 1 to 11, wherein the second predetermined conditions include an indication that the difference between a first amount of data being transmitted or received by the first relay node and a second amount of data being transmitted or received by the second relay node being below a predetermined threshold.

Paragraph 13. A mobile communications system according to any of paragraphs 1 to 12, wherein the second predetermined conditions include an indication that a communications link between the second relay node and the communications terminal and/or base station being of a lower quality than a communications link between the first relay node and the communications terminal and/or base station.

Paragraph 14. A mobile communications system according to any of paragraphs 1 to 13, wherein the communications terminal is configured to transmit a request message to the first relay node for transmission to the base station.

Paragraph 15. A mobile communications system according to any of paragraphs 1 to 14, wherein the controller is configured
upon third predetermined conditions being met, to control a third relay node of the plurality of relay nodes to transmit signals representing the data to the communications terminal or to receive signals representing the data from the communications terminal, such that the communications terminal is associated with three of the plurality of relay nodes, and
to control the communications terminal to transmit a third signal representing at least a third part of the data to the third relay node for transmission for the base station.

Paragraph 16. A method of operating a relay node in a mobile communications system, the method comprising
receiving a first indication to transmit signals representing first data to a communications terminal, to one or more other relay nodes and to a base station, and to receive signals representing the first data from the communications terminal, to the one or more other relay nodes and the base station, and
receiving a second indication to transmit signals representing second data to the one or more other relay nodes and to the base station, and to receive signals representing the second data to the one or more other relay nodes and to the base station.

Paragraph 17. A communications terminal forming part of a mobile communications system, the communications terminal being configured
to transmit signals representing data to a first relay node of a plurality of relay nodes, and
upon predetermined conditions being met to transmit signals representing at least a first part of the data to the first relay node and to transmit signals representing at least a second part of the data to a second relay node of the plurality of relay nodes.

Paragraph 18. A communications terminal according to paragraph 17, where upon the predetermined conditions being met, the communications terminal is configured to transmit a request message to the first relay node.

Paragraph 19. A communications terminal according to paragraph 17, where upon the predetermined conditions being met, a controller is configured to control the communications terminal to transmit signals representing at least the second part of the data to the second relay node.

REFERENCES

[1] 3GPP TR36.872 V12.1.0, "Small cell enhancements for E-UTRA and E-UTRAN—Physical Layer aspects", December 2013.
[2] Holma H. and Toskala A., "LTE for UMTS OFDMA and SC-FDMA Based Radio Access", John Wiley & Sons Limited, January 2010.

The invention claimed is:
1. A mobile communications system comprising
a base station, the base station including a transmitter and a receiver, the transmitter being configured to transmit signals via a wireless access interface to a plurality of relay nodes and to one or more communications terminals, and the receiver being configured to receive signals via the wireless access interface from the plurality of relay nodes and from the one or more communications terminals, and a controller operatively coupled to the base station and configured to control a first relay node of the plurality relay nodes to transmit signals representing the data to one of the communications terminals received from the base station or to receive signals representing the data from the communications terminal for transmission to the base station, wherein, upon first predetermined conditions being met, to control a second relay node of the plurality of relay nodes to transmit signals representing the data to the communications terminal received from the base station or to receive signals representing the data from the communications terminal for transmission to the base station, and to control the communications terminal to transmit a first signal representing at least a first part of the data to the first relay node for transmission to the base station, and to transmit a second signal representing at least a second part of the data to the second relay node for transmission to the base station.

2. A mobile communications system as claimed in claim 1, wherein the controller is configured upon second predetermined conditions being met, to control the second relay node not to transmit signals to the communications terminal and not to receive signals from the communications terminal, such that the communications terminal is associated only with the first relay node, and to control the communications terminal to transmit a signal representing the data to the first relay node for transmission to the base station.

3. A mobile communications system as claimed in claim 1, wherein the controller is configured to control the first relay node to transmit signals to the communications terminal via a first carrier signal and to receive signals from the communications terminal via the first carrier signal and to control the second relay node to transmit signals to the communications terminal via a second carrier signal and to receive signals from the communications terminal via the second carrier signal.

4. A mobile communications system as claimed in claim 1, wherein the controller is configured to control the first relay node to transmit signals to the communications terminal in first communications resources and to receive signals from the communications terminal in the first communications resources and to control the second relay node to transmit signals to the communications terminal in second communications resources and to receive signals from the communications terminal in the second communications resources.

5. A mobile communications system as claimed in claim 1, wherein the controller is configured to assign a first identifier to the first relay node and a second identifier to the second relay node.

6. A mobile communications system as claimed in claim 1, wherein the first predetermined conditions include an amount of data being transmitted or received by the first relay node being above a predetermined threshold.

7. A mobile communications system as claimed in claim 1, wherein the first predetermined conditions include an amount of power being consumed by the first relay node being above a predetermined threshold.

8. A mobile communications system as claimed in claim 1, wherein the first predetermined conditions include an indication that the difference between a first amount of data being transmitted or received by the first relay node and a second amount of data being transmitted or received by the second relay node being above a predetermined threshold.

9. A mobile communications system as claimed in claim 1, wherein the first predetermined conditions include an indication that a communications link between the second relay node and the communications terminal and/or base station being of a higher quality than a communications link between the first relay node and the communications terminal and/or base station.

10. A mobile communications system as claimed in claim 2, wherein the second predetermined conditions include an indication that an amount of data being transmitted or received by the first relay node being below a predetermined threshold.

11. A mobile communications system as claimed in claim 2, wherein the second predetermined conditions include an indication that an amount of power being consumed by the first relay node being below a predetermined threshold.

12. A mobile communications system as claimed in claim 2, wherein the second predetermined conditions include an indication that the difference between a first amount of data being transmitted or received by the first relay node and a second amount of data being transmitted or received by the second relay node being below a predetermined threshold.

13. A mobile communications system as claimed in claim 2, wherein the second predetermined conditions include an indication that a communications link between the second relay node and the communications terminal and/or base station being of a lower quality than a communications link between the first relay node and the communications terminal and/or base station.

14. A mobile communications system as claimed in claim 1 wherein the communications terminal is configured to transmit a request message to the first relay node for transmission to the base station.

15. A mobile communications system as claimed in claim 1, wherein the controller is configured upon third predetermined conditions being met, to control a third relay node of the plurality of relay nodes to transmit signals representing the data to the communications terminal or to receive signals representing the data from the communications terminal, such that the communications terminal is associated with three of the plurality of relay nodes, and to control the communications terminal to transmit a third signal representing at least a third part of the data to the third relay node for transmission for the base station.

16. A base station comprising:

a transmitter configured to transmit signals via a wireless access interface to a plurality of relay nodes and to one or more communications terminals;

a receiver configured to receive signals via the wireless access interface from the plurality of relay nodes and from the one or more communications terminals; and processing circuitry configured to control a first relay node of the plurality relay nodes to transmit signals representing the data to one of the communications terminals received from the base station or to receive signals representing the data from the communications terminal for transmission to the base station, wherein, upon first predetermined conditions being met, control a second relay node of the plurality of relay nodes to transmit signals representing the data to the communications terminal received from the base station or to receive signals representing the data from the communications terminal for transmission to the base station, and control the communications terminal to transmit a first signal representing at least a first part of the data to the first relay node for transmission to the base station, and to transmit a second signal representing at least a second part of the data to the second relay node for transmission to the base station.

17. Circuitry for a base station, the circuitry comprising:

transmitter circuitry configured to transmit signals via a wireless access interface to a plurality of relay nodes and to one or more communications terminals;

receiver circuitry configured to receive signals via the wireless access interface from the plurality of relay nodes and from the one or more communications terminals; and processing circuitry configured to control a first relay node of the plurality relay nodes to transmit signals representing the data to one of the communications terminals received from the base station or to receive signals representing the data from the communications terminal for transmission to the base station, wherein, upon first predetermined conditions being met, control a second relay node of the plurality of relay nodes to transmit signals representing the data to the communications terminal received from the base station or to receive signals representing the data from the communications terminal for transmission to the base station, and control the communications terminal to transmit a first signal representing at least a first part of the data to the first relay node for transmission to the base station, and to transmit a second signal representing at least a second part of the data to the second relay node for transmission to the base station.

* * * * *